United States Patent [19]

Cole, Sr.

[11] 4,283,828

[45] Aug. 18, 1981

[54] ENDLESS TRACK SUPPORT TOOL

[76] Inventor: Wilbur C. Cole, Sr., 360 Fort Lewis Blvd., Salem, Va. 24153

[21] Appl. No.: 110,154

[22] Filed: Jan. 7, 1980

[51] Int. Cl.³ .................... B23P 19/04

[52] U.S. Cl. .................... 29/256; 29/281.4; 254/85; 254/100; 269/60; 269/253

[58] Field of Search .................... 254/85, 100; 269/71, 269/60, 45, 253; 29/256, 259, 281:1, 281.4

[56] References Cited

U.S. PATENT DOCUMENTS

| | | | |
|---|---|---|---|
| 330,842 | 11/1885 | Longmore . | |
| 453,654 | 6/1891 | Morton | 269/71 |
| 622,208 | 3/1899 | Cox . | |
| 754,115 | 3/1904 | Bailey . | |
| 1,045,146 | 11/1912 | Hunter . | |
| 1,131,018 | 3/1915 | Troutman . | |
| 1,453,901 | 5/1923 | Andersen | 269/45 |
| 1,889,965 | 12/1932 | Kendall . | |
| 2,469,500 | 5/1949 | Dry . | |
| 2,620,695 | 12/1952 | Eierman | 269/253 X |

*Primary Examiner*—Robert C. Watson
*Attorney, Agent, or Firm*—Dowell & Dowell

[57] ABSTRACT

An apparatus for removing support and guidance rollers from an endless track vehicle so that the rollers may be repaired or replaced. The apparatus includes a tool having a base on which a generally vertical threaded shaft is mounted and such shaft may be selectively rotated to raise and lower a travelling block and such block carries a generally horizontal threaded shaft having a cradle or other support means at one end which receives and supports an endless track support and guidance roller when such roller is to be removed and replaced.

6 Claims, 5 Drawing Figures

ENDLESS TRACK SUPPORT TOOL

SUMMARY OF THE INVENTION

This invention relates generally to vehicles of the crawler type having endless tracks and is embodied particularly in a tool which is used for removing and replacing one or more endless track support and guidance rollers in a minimum of time and with minimum of effort. In the past, it has been necessary to remove the support and guidance rollers of crawler type vehicles having endless tracks approximately once a year for servicing, repairing or replacing the same. This usually has required several hours time by workmen with jacks and blocks, if only one roller is to be changed. If all of the rollers are to be changed, it has been necessary to separate the tracks, remove the truck frame from the vehicle and invert the frame so that all of the rollers are disposed upwardly. Thereafter, the rollers are removed one at a time and are inspected, and are repaired or replaced if necessary. This procedure has required substantially more time than the removal of a single roller.

In the present invention a tool is provided whereby one man is able to remove and replace one or all of the support and guidance rollers in approximately one-half the time previously required by several workmen. The invention includes a pair of adjustment means associated with a travelling block mounted on a base. One of the adjusting means is provided with a cradle or platform for receiving and supporting an article such as a support and guidance roller and selectively moves the cradle and the article toward and from the travelling block. The other adjusting means selectively moves the travelling block up and down relative to the base. Guide means are provided for the travelling block and the cradle to prevent rotation of the travelling block and the cradle.

BRIEF DESCRIPTION OF THE DRAWINGS

FIG. 4 is an enlarged sectional view taken along the line 5—5 of FIG. 3.

DESCRIPTION OF THE PREFERRED EMBODIMENT

Figure 1:
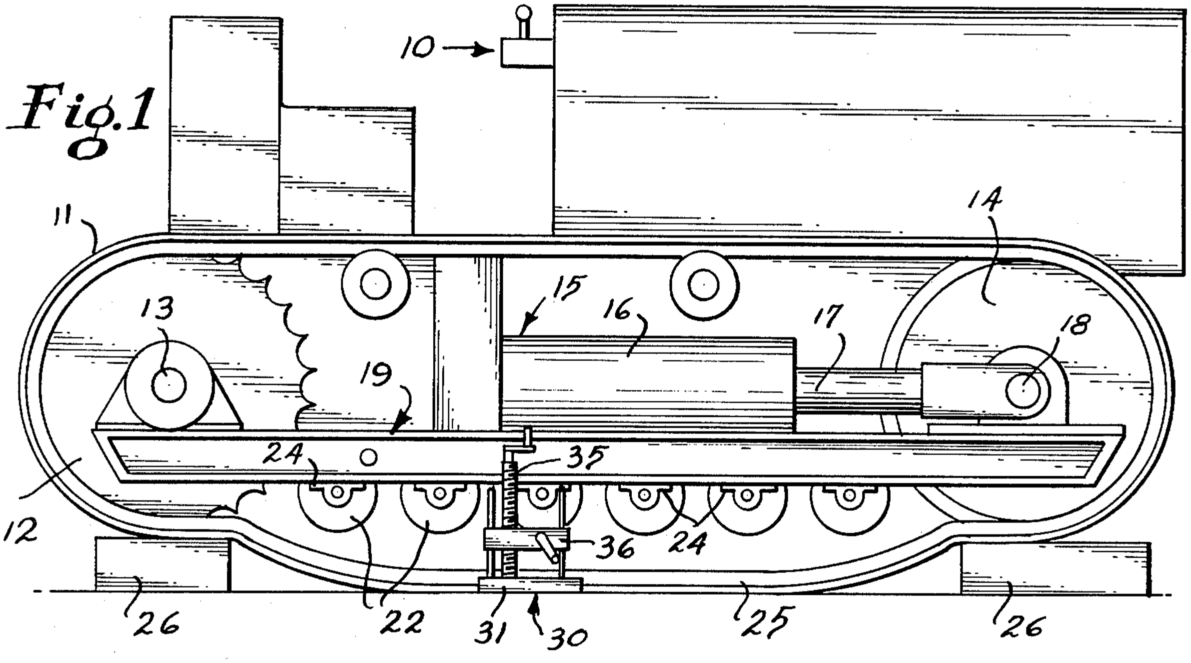
FIG. 1 is a side elevational view illustrating one application of the invention in use with a crawler type vehicle.

With continued reference to the drawings a crawler type vehicle 10 of conventional construction includes an endless track on each side. Each of the tracks is driven by a drive sprocket 12 mounted on an axle 13 which in turn is driven by the power plant of the vehicle. The drive sprocket 12 usually is located at the rear of the vehicle and an idler wheel or sprocket 14 is located adjacent to the front of the vehicle. The idler wheel or sprocket is connected to a conventional track adjuster or tightener 15. As illustrated in FIG. 1, the track tightener includes a fluid cylinder 16 having a piston rod 17 connected to the axle 18 of the idler sprocket and is slidably mounted on a truck frame 19.

Figure 2:
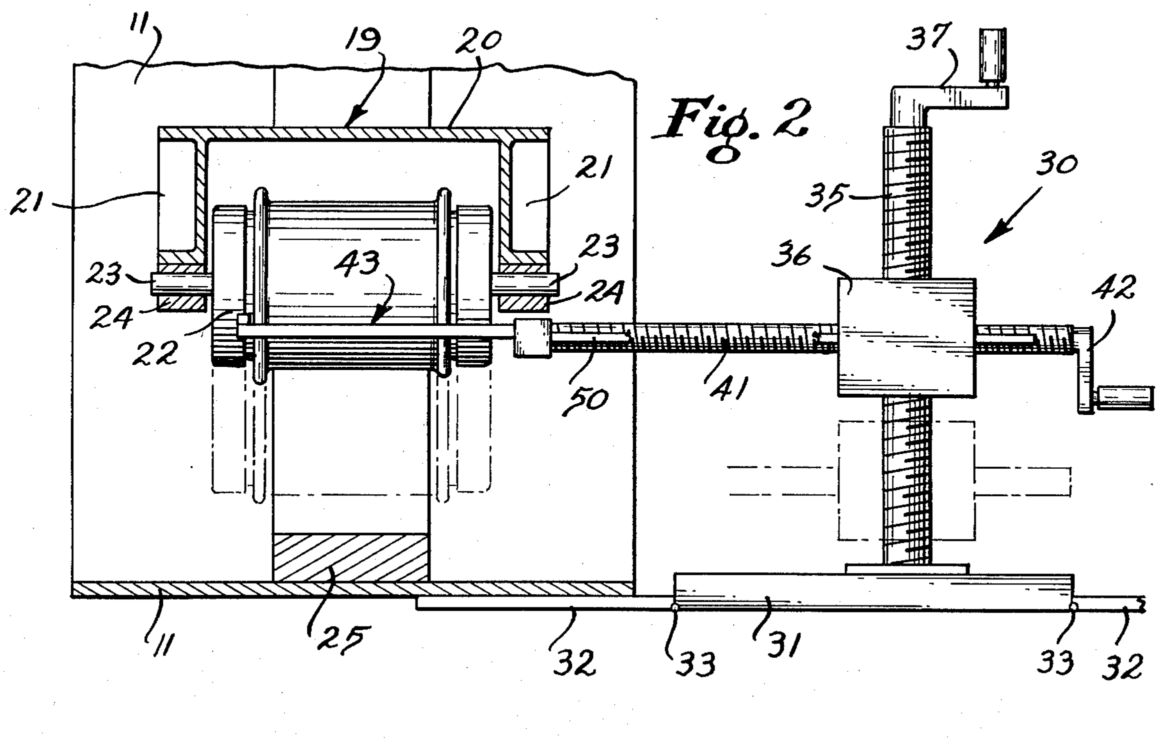
FIG. 2 is an enlarged sectional view taken along the line 2—2 of FIG. 1.

As illustrated best in FIG. 2, the truck frame 19 includes an inverted generally "U" shape cross section having a web portion 20 and a pair of depending flanges 21. A plurality of endless track support and guidance rollers 22 are mounted on the truck frame 19 and each of the support guidance rollers includes an axle 23 which is removably connected to the flanges 21 of the truck frame in any desired manner such as by pillow blocks 24. Normally, the support and guidance rollers engage a rail 25 forming part of the endless track 11 for supporting the vehicle intermediate the drive and idler sprockets 12 and 14 respectively.

When it is necessary to service, repair or replace one or more of the support and guidance rollers, a pair of spaced support blocks 26 are placed on the ground and the vehicle is driven onto such blocks so that the drive and idler sprockets are located above such blocks. Thereafter, the track tightener 15 is operated to retract the idler sprocket 14 and provide a slack in the lower run of the endless track 11 to permit the lower run of the track to sag into engagement with the ground. By doing this, the rail 25 is moved out of engagement with the support and guidance rollers 22.

In order to remove and replace the support and guidance rollers 22 relative to the truck frame 19, an adjusting tool 30 is provided having a base 31. Preferably the base has an extension 32 connected to each end by hinges 33 in such a manner that the extensions may be folded against the base when not in use. As illustrated in FIG. 2, when the tool is in use, the extensions 32 are folded outwardly and one of such extensions is inserted between the track 11 and the ground to afford stability to the tool. If desired, the outer ends of the extensions 32 may include one or more openings 34 which receive anchor bolt (not shown) under certain conditions, such as when the endless track 11 is removed from the vehicle.

A generally vertically disposed threaded shaft is rotatably mounted on the base 31 and such shaft threadedly engages a travelling block 36. The upper end of the shaft 35 is provided with a crank arm 37, for selectively rotating such shaft and causing the travelling block 36 to be raised and lowered relative to the base 31. A pair of guide rods 38 are slidably received within openings 39 at opposite ends of the travelling block 36 and each of such rods is removably received within openings 40 in the base 31. The guide rods 38 normally prevent rotation of the travelling block when the shaft 35 is rotated by the crank arm 37. However, when it is desired to rotate the travelling block, as well be described later, the guide rods 38 may be moved vertically, upwardly out of the openings 40 in the base.

The travelling block 36 is provided with a horizontally disposed threaded shaft 41 which is offset laterally from the vertical shaft 35 and such horizontal shaft is provided with a crank arm 42 at one end which is used to rotate such shaft and cause the shaft to be extended and retracted relative to the travelling block. At the opposite end of the horizontal shaft a cradel or other support member 43 is provided and such cradle includes a base portion 44 having a pair of outwardly extending generally parallel arms 45 and if desired, such arms may have upwardly extending fingers 46. When the tool is to be used for a generally cylindrical member such as a support and guidance roller, the arms 45 are spaced apart a distance less than the diameter of the roller so that the roller is supported between the arms. Also the arms are of a length such that the roller will be supported on the arms without engaging the base portion 44.

Figure 4:
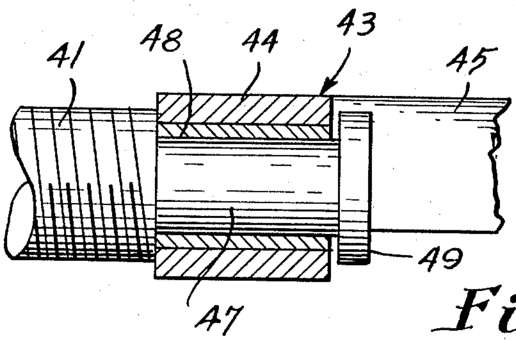
FIG. 4 is an enlarged sectional view taken along the line 4—4 of FIG. 3.

With particular reference to FIG. 4, the horizontal shaft 41 is adapted to be rotated but at the same time, it is important that the cradle 43 remain in a generally horizontal position while supporting the roller or other article. In order to do this the horizontal shaft 41 is provided with an end portion of reduced diameter 47 which is rotatably received within an opening 48 in the base portion 44 of the cradle. An end cap 49 is attached to the reduced end portion 47 after the end portion is located within the opening 48 to prevent the cradle from being removed from the horizontal shaft.

Figure 5:
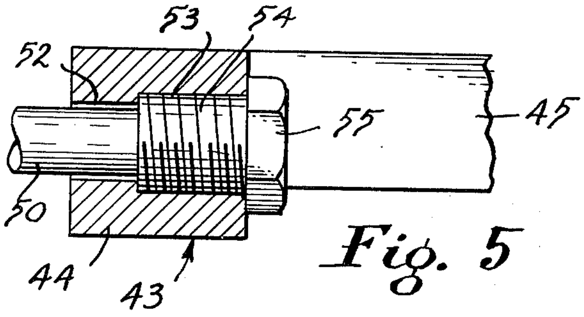
Figure 3:
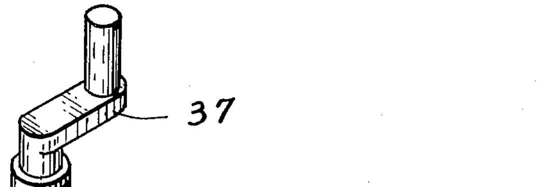
FIG. 3 is a perspective view of the adjusting tool per se.
Figure 3:
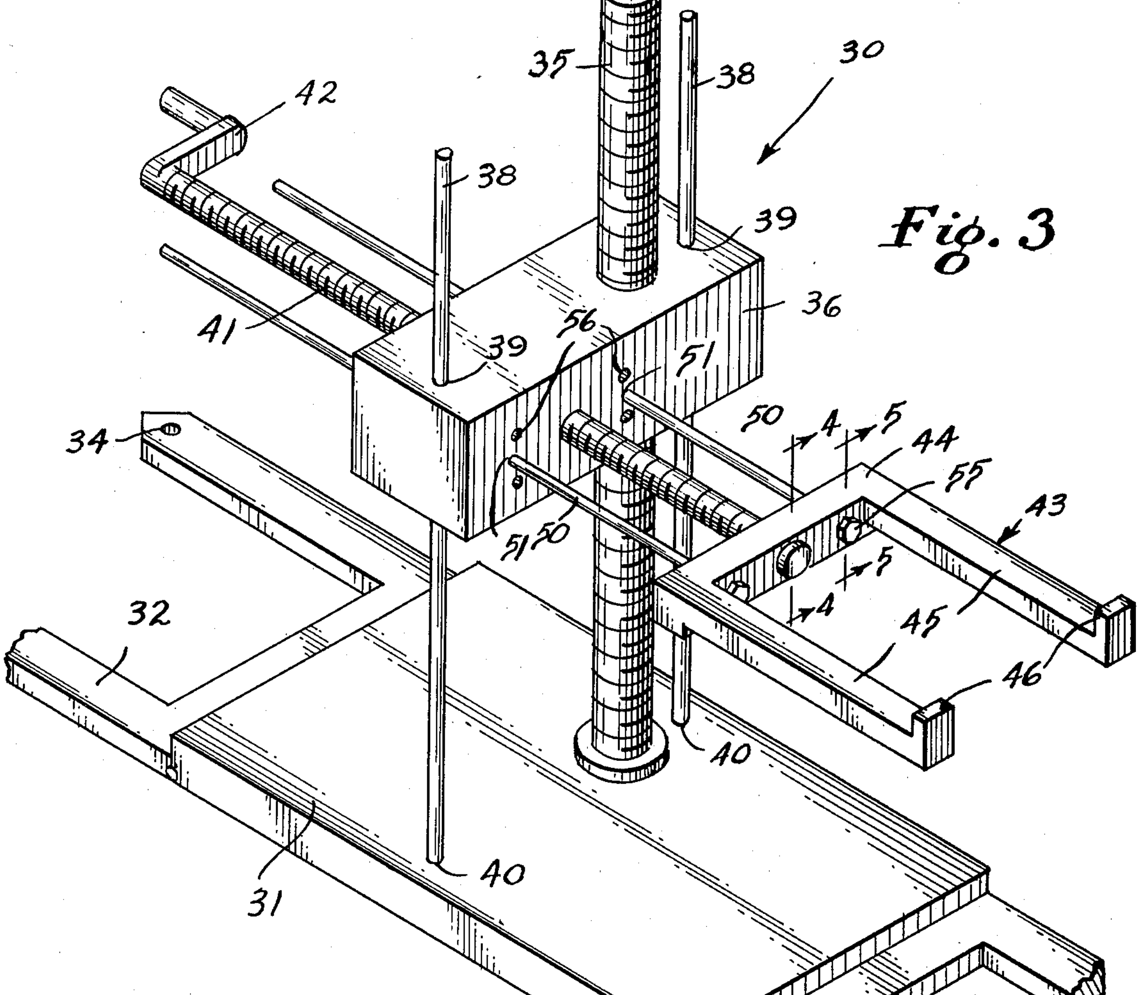
Figure 3:
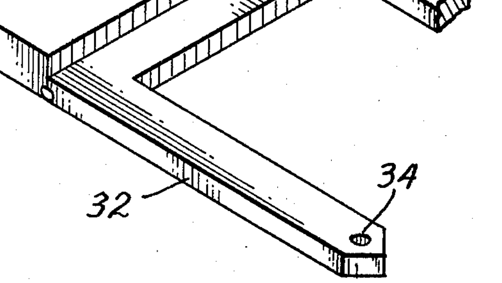

In order to prevent rotation of the cradle 43 when the horizontal shaft 41 is being moved in and out relative to the travelling block 36, a pair of guide rods 50 are removably attached to the base portion 44 of the cradle and such rods are slidably received within openings 51 in the travelling block 36. With reference to FIG. 5, the ends of the guide rods 50 are removably attached to the base portion 44 in any desired manner such as by providing a horizontally disposed bore 52 and counterbore 53 through the base portion 44 of the cradle and providing the counterbore with threads. The ends of the guide rods 50 have threaded enlargements 54 of a size to be received within the openings of the counterbore 53. Also each of the guide bars 50 has a head 55 by means of which the enlargements 54 are tightened within the counterbores 53.

It is contemplated that at times it may be desireable to arrange the cradle 43 at an angle to the base 31 particularly when the vehicle may be located on uneven ground and it is not possible to position the vertical shaft 35 along a truly vertical axis. In this case, the travelling block 36 is provided with a plurality of additional openings 56 the axes of which are generally parallel to the axes of the openings 51 and are located on an arc with such openings 51 using the axis of the horizontal shaft 41 as a radius point. When the cradle is to be tilted, the guide rods 50 may be removed by unscrewing the enlargements 54 and retracting the guide rods from the openings 51 after which the cradle is tilted to a desired angle and the rods are inserted into the openings 56.

It is noted that although the description of the present invention has been directed to threaded adjustments which are rotated by hand, it is contemplated that such adjustments could be powered by electric or fluid motors. Also it is contemplated that if the tool is to be used on a hard floor, rollers or other wheels could be provided beneath the base 31 so that the tool is easily portable. Further it is contemplated that the apparatus could have a handle attached thereto for manipulating the base and the tool and also it is apparent that the base member could have one or more recesses into which the extensions 32 may be retracted.

In the operation of the device after the vehicle has been moved onto the support blocks 26 and the endless track 11 has been caused to sag by retracting the track tightener 15, the tool 30 is positioned adjacent to the track and substantially in alignment with one of the support and guidance rollers 22. In this position the extension 32 is pushed below the track 11 after which the horizontal shaft 41 is rotated to cause the cradle 43 to be located directly below the roller 22. Thereafter the vertical shaft 35 is rotated to raise the travelling block 36 until the cradle intimately engages the support and guidance roller. In this position the pillow blocks 24 on both sides of the truck frame 19 are released so that the support and guidance roller is supported only by the cradle 43. Then the vertical shaft 35 is rotated to lower the support and guidance roller to the point where the roller is clear of the truck frame as well as the other support and guidance rollers.

In this position the vertically disposed guide rods 38 may be lifted so that the lower end is removed from the openings 40 in the base 31 after which the travelling block and the horizontal shaft carried thereby may be rotated to swing the support and guidance roller carried by the cradle out of alignment with the vehicle and the remaining rollers on the truck frame. The roller may be removed directly from the cradle 43 or, if desired, the vertical shaft 35 may be rotated again to lower the roller into engagement with the ground so that the roller may be rolled off of the cradle and a new or a reconditioned roller may be rolled into position onto the cradle. The reversing of the above operations will bring the new roller into position formerly occupied by the roller which has been removed and since the base has not been moved, very little adjustment is required to align the pillow blocks 24 with the openings in the truck frame to once again secure the roller to the frame.

I claim:

1. A portable apparatus for removing and replacing a support and guidance roller on a vehicle having an endless track, comprising a base, a travelling block means adjustably mounted on said base, a first adjusting means for moving said travelling block means relative to said base in a generally vertical direction, a second adjusting means carried by said travelling block means for movement in a horizontal direction, cradle means carried by said second adjusting means and being movable toward and from said travelling block means selectively, first guide means for guiding said travelling block means relative to said base, second guide means for guiding said cradle means relative to said travelling block means, means for stabilizing said base in a direction parallel to said second guide means when said first guide means is engaged, and means for selectively operating said first and second adjusting means, whereby said cradle means may be moved into intimate supporting engagement with a support and guidance roller mounted on a vehicle and thereafter the apparatus is operated to remove the roller from the vehicle.

2. The invention of claim 1 in which said first and second adjusting means include threaded shafts, and said operating means includes a crank on each shaft.

3. The invention of claim 1 in which said first guide means includes a first pair of rods carried by said base and being slidably received within openings at opposite ends of said travelling block means.

4. The invention of claim 3 which said first pair of rods are removably received within openings in said base to permit said travelling block to be rotated when said rods are removed from the openings in said base.

5. The invention of claim 1 in which said second guide means includes a second pair of rods, means for removably mounting said second rods on said cradle means, and said travelling block means having a plurality of pairs of openings extending therethrough and being of a size to selectively slidably receive said second rods.

6. A portable apparatus for removing and replacing a support and guidance roller on a vehicle having an endless track, comprising a base, a first adjusting means mounted on said base, a travelling block carried by said first adjusting means and being movable from a position adjacent to said base to a position remote therefrom in a generally vertical direction, a second adjusting means extending through said travelling block for movement in a generally horizontal direction along an axis generally normal to the axis of said first adjusting means, cradle means carried by said second adjusting means and being movable toward and from said travelling block selectively by operation of said second adjusting means, at least one first guide rod for guiding said travelling block relative to said base, said first guide rod normally connected to said base and slidably received within a first opening in said travelling block to prevent rotation of said travelling block, said first guide rod being selectively detached from said base to permit rotation of said travelling block relative to said base, at least one second guide rod removably mounted on said cradle means for guiding said cradle means relative to said travelling block, said travelling block having a plurality of second openings extending therethrough for selectively receiving said second guide rod, the axes of said second openings being parallel with the axis of said second adjusting means and generally concentric therewith so that said cradle means may be in parallel or non-parallel relationship with said base, and means for selectively operating said first and second adjusting means, whereby said cradle means may be moved into intimate supporting engagement with a support and guidance roller mounted on a vehicle and thereafter the apparatus is operated to assist in removing the roller from the vehicle.

* * * * *